(No Model.)
H. C. WAGNER.
ELECTRIC BODY BATTERY.
No. 501,550.                    Patented July 18, 1893.
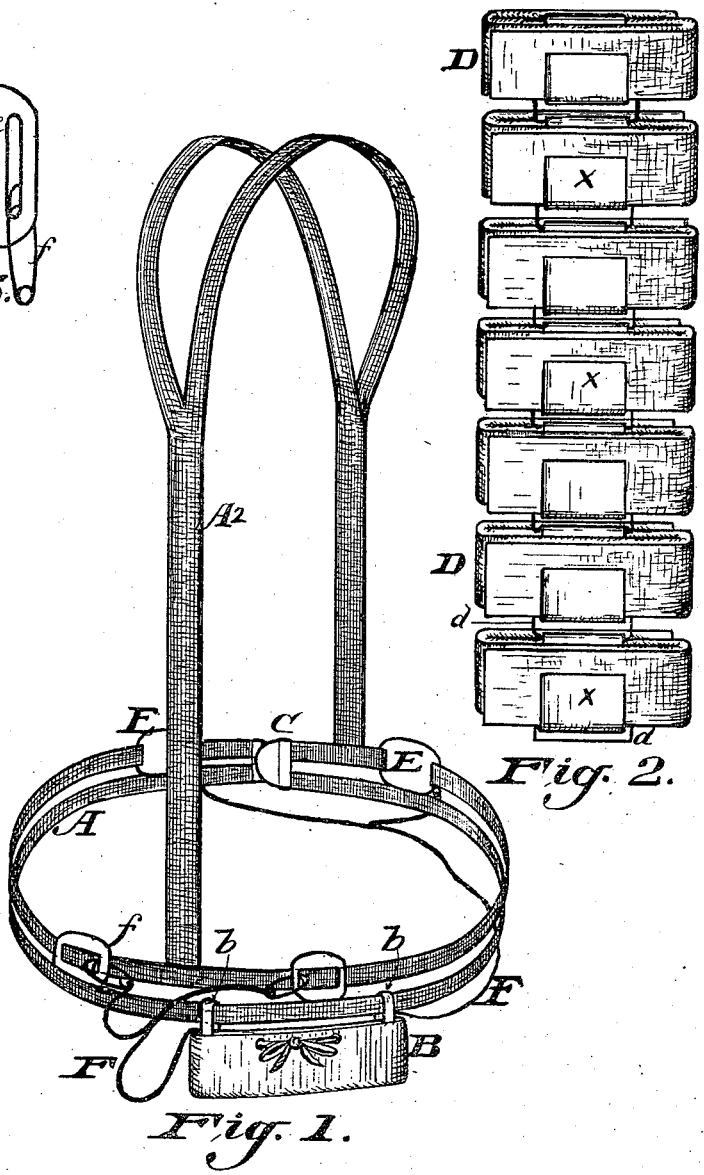
Witness,
O. M. Buettner.
M. E. Horton.
Inventor,
Harry C. Wagner.
by Geo. W. Tibbitts, Atty.

UNITED STATES PATENT OFFICE.

HARRY C. WAGNER, OF CLEVELAND, OHIO.

ELECTRIC BODY-BATTERY.

SPECIFICATION forming part of Letters Patent No. 501,550, dated July 18, 1893.

Application filed September 1, 1892. Serial No. 444,720. (No model.)

*To all whom it may concern:*

Be it known that I, HARRY C. WAGNER, a citizen of the United States, residing at Cleveland, in the county of Cuyahoga and State of Ohio, have invented certain new and useful Improvements in Electric Body Batteries and Appliances, of which the following is a specification.

This invention relates to electric batteries and appliances for the treatment of diseases of the human body, and consists in the peculiar construction of the battery, the electrodes and means of applying same, substantially as hereinafter described and pointed out in the claims.

In the accompanying drawings—Figure 1 is a perspective view of a belt having my improved appliances attached. Fig. 2 is an enlarged detached perspective view of my improved battery. Fig. 3 is a detached view of one of the electrodes. Fig. 4 is a detached view of the metal pieces comprised in one of the battery cells.

A represents a double body belt, or a belt made of two separate strands of webbing, the ends of which are adjustably attached to a clasp C.

$A^2$ is a suspender strap, which may be of the well known kind, and which may be used or not as may be desired.

B is a pocket or sack having loops $b$ for adjustably hanging or suspending it on the belt, provided for containing the battery.

D D represent the battery cells which are composed as follows:

Z, Fig. 4 is a strip of zinc and X is a strip of copper, bent in the form shown. To the zinc piece is attached a wire loop $d$, by means of which the cells may be linked together as seen in Fig. 2. Before folding the metal pieces X Z, the zinc strip is covered with flannel or a woolen fabric, and then the strip is folded with the copper strip X interwoven and the ends folded over on the outside, as shown, thus making a simple, convenient and easily adjusted cell, any required number of which may be linked together to form a battery.

E are electrodes formed of metal plates having slots $e$ $e$, near the ends by means of which they may be attached to the belt by passing the webbing through, which gives perfect freedom for adjustment at any desired place on the belt.

F is the conducting wire for conveying the electric current from the battery to the electrodes and is provided with ordinary safety pins $f$ $f$, for attaching same to the battery and electrodes, they being very readily attached and detached.

The pockets or sacks, of which there may be one or more hung on the belt, have waterproof lining, the woolen coverings of the cells being saturated with vinegar or diluted acid, and comprise the battery for generating the electrical current.

By the use of the double belt, the electrodes are attached to the upper one and the pockets or sacks are suspended from the lower one. This provides easy adjustment of either relatively, and permits of clasping the upper strand tightly and the lower one loosely upon the body.

Having described my invention, I claim—

1. In an electric body belt a series of cells D consisting of a zinc strip Z having its ends folded back, openly, upon itself, a copper strip X also having its ends folded back, openly upon itself, and interwoven crosswise with the zinc strip, and having an absorbent material interposed between the said strips, and a wire loop $d$ attached to zinc strip and linked to the copper strip of the adjacent cell, substantially as described.

2. In an electric body belt, the combination of two belts A, having a common clasp or buckle C, and provided with supporting shoulder straps $A^2$, a pocket B having loops $b$, $b$, for suspending same on lower belt, and containing the battery cells D, electrode E having slots $e$ $e$ for attaching same onto upper belt and provided with safety pin $f$, wires F connecting said electrodes with the battery cells, substantially as described.

HARRY C. WAGNER.

Witnesses:
GEO. W. TIBBITTS,
JAS. F. WALSH.